(12) United States Patent
Su et al.

(10) Patent No.: US 8,761,564 B2
(45) Date of Patent: Jun. 24, 2014

(54) MODULAR PLUG AND JACK CONNECTOR ASSEMBLY

(71) Applicant: Avago Technologies General IP (Singapore) Pte. Ltd., Singapore (SG)

(72) Inventors: Chung-Yi Su, Fremont, CA (US); Tak Kui Wang, Cupertino, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/896,903

(22) Filed: May 17, 2013

(65) Prior Publication Data

US 2013/0251376 A1    Sep. 26, 2013

Related U.S. Application Data

(62) Division of application No. 12/754,545, filed on Apr. 5, 2010, now Pat. No. 8,467,654.

(51) Int. Cl.
*G02B 6/00* (2006.01)
*G02B 6/36* (2006.01)

(52) U.S. Cl.
USPC ............... 385/139; 385/75; 385/78; 398/116; 398/117; 439/638

(58) Field of Classification Search
USPC .......... 385/55, 75, 76, 78, 139; 398/116–117; 439/638, 676
See application file for complete search history.

(56) References Cited

U.S. PATENT DOCUMENTS

| | | |
|---|---|---|
| 5,599,206 A | 2/1997 | Slack et al. |
| 5,745,622 A | 4/1998 | Birnbaum et al. |
| 5,896,480 A | 4/1999 | Scharf et al. |
| 6,341,899 B1 | 1/2002 | Shirakawa et al. |
| 6,381,283 B1 | 4/2002 | Bhardwaj et al. |
| 6,500,026 B2 | 12/2002 | Yamaguchi |
| 6,588,938 B1 | 7/2003 | Lampert et al. |
| 7,147,519 B2 | 12/2006 | Reichle |
| 7,326,087 B2 | 2/2008 | Gerlach et al. |
| 7,488,115 B2 | 2/2009 | Theis |
| 8,011,972 B2 | 9/2011 | Caveney et al. |
| 8,376,630 B2 * | 2/2013 | Wang et al. ............... 385/78 |
| 8,467,654 B2 * | 6/2013 | Su et al. ............... 385/139 |
| 2005/0186822 A1 | 8/2005 | Serino et al. |
| 2006/0263011 A1 | 11/2006 | Chen et al. |

FOREIGN PATENT DOCUMENTS

| | | |
|---|---|---|
| CN | 1244928 | 2/2000 |
| CN | 1913256 | 2/2007 |
| CN | 100388031 | 5/2008 |
| CN | 101223465 | 7/2008 |
| EP | 2075604 | 7/2009 |
| TW | 445674 | 7/2001 |

OTHER PUBLICATIONS

"UTP Cable Termination Standards 568A Vs 568B", *Hamilton* Feb. 2007.

* cited by examiner

*Primary Examiner* — Daniel Petkovsek

(57) ABSTRACT

A modular connector assembly is provided that has both an electrical coupling configuration that complies with the RJ-45 wiring standard and an optical coupling configuration that provides the assembly with optical communications capabilities. In addition, the modular connector assembly is configured to have backwards compatibility with existing 8P8C jacks and plugs that implement the RJ-45 wiring standard. Consequently, the modular connector assembly may be used to communicate optical data signals at higher data rates (e.g., 10 Gb/s and higher) or to communicate electrical data signals at lower data rates (e.g., 1 Gb/s).

20 Claims, 16 Drawing Sheets

MODULAR PLUG AND JACK CONNECTOR ASSEMBLY

CROSS-REFERENCE TO RELATED APPLICATIONS

This application is a divisional application of application Ser. No. 12/754,545, filed on Apr. 5, 2010, and issued as U.S. Pat. No. 8,467,654 entitled "A MODULAR CONNECTOR ASSEMBLY CONFIGURED WITH BOTH OPTICAL AND ELECTRICAL CONNECTIONS FOR PROVIDING BOTH OPTICAL AND ELECTRICAL COMMUNICATIONS CAPABILITIES, AND A SYSTEM THAT INCORPORATES THE ASSEMBLY", which is incorporated herein by reference in its entirety.

TECHNICAL FIELD OF THE INVENTION

The invention relates to modular connector assemblies of the type that comply with registered jack-45 (RJ-45) wiring standards. More particularly, the invention is directed to a modular connector assembly having both an electrical coupling configuration that complies with the RJ-45 wiring standard and an optical coupling configuration that provides the assembly with optical communications capabilities.

BACKGROUND OF THE INVENTION

A variety of modular connector assemblies are used to electrically couple electrical signals between the ends of electrical conductors contained in electrical cables and electrical contacts of electrical circuitry of terminal equipment connected to the ends of the cables. A modular connector assembly has a plug that terminates the end of the electrical cable and a jack that mates with the plug. The exterior surface of the plug and the interior surface of the jack have mating features located on them that mate with each other to removably interlock the plug inside of the jack. When the plug is interlocked in a mating relationship with the jack, respective electrical contacts of the plug are in contact with respective electrical contacts of the jack. The electrical contacts of the plug are electrically coupled with the ends of respective electrical conductors of the cable. Similarly, the electrical contacts of the jack are electrically coupled with respective electrical contacts of electrical circuitry of the terminal equipment. Through all of these electrical connections, electrical signals being carried on the electrical conductors of the cable are electrically coupled to the electrical circuitry of the terminal equipment, and vice versa.

One type of modular connector assembly that is well known in the communications industry is an eight position, eight contact (8P8C) modular connector assembly. The 8P8C modular connector assembly is often used with twisted copper pairs to communicate electrical data signals over Ethernet-based communications networks. In Ethernet-based communications networks, the electrical contacts and other circuitry of the 8P8C connector assembly are configured to comply with the RJ-45 wiring standards, which are called the T-568A and T-568B wiring standards. Because these types of modular connector assemblies are made to comply with the RJ-45 wiring standards when they are manufactured for use in Ethernet-based communications networks, they are often referred to as RJ-45 connectors.

Ethernet-based communications networks currently have the capability of carrying electrical data signals at data rates in excess of 1 gigabits per second (Gb/s). Although optical communications links are currently capable of operating at date rates of 10 Gb/s over distances of up to about 100 meters (m), the use of such optical links generally has not spread into areas occupied by high-speed Ethernet-based networks. One reason that the use of optical links has not spread into this space is that the costs of manufacturing pluggable optical modular connector assemblies that can operate at these data rates are much higher than the costs of manufacturing 8P8C modular connector assemblies that operate at these data rates. Another reason that the use of optical links has not spread into this space is that there are currently no optical solutions that have backwards compatibility to the existing electrical Ethernet solutions. Although it is possible to design electrical connections that operate at data rates higher than 1 Gb/s using 8P8C modular connectors that implement the RJ-45 wiring standard, such connections would consume much more power than optical connections operating at the same data rate. In addition, the complexity of the design for such high data rate electrical connections would result in the connections being significantly more expensive than those that operate at 1 Gb/s. Furthermore, a new cabling scheme with higher costs would be required to propagate the data signals at data rates higher than 1 Gb/s over distances of about 100 meters (m).

There are currently a large number of servers and other equipment that have 8P8C modular connectors that have electrical contacts and circuitry configured in accordance with the RJ-45 standard. It would be desirable to provide a modular connector assembly that provides both optical and electrical communications capabilities and that is backwards compatible with existing 8P8C modular connector assemblies that implement RJ-45 wiring standards.

SUMMARY OF THE INVENTION

The invention is directed to a jack, a plug, a modular connector assembly that comprises the jack and plug, and a system that incorporates the modular connector assembly. The jack comprises a jack housing having a front portion, a back portion, an optical interface formed in the back portion, and an electrical contact configuration. The front portion has a plug opening formed therein that is configured to receive a plug. The optical interface is configured to optically couple with one or more modules that perform optical-to-electrical (OE) conversion and electrical-to-optical (EO) conversion. The electrical contact configuration complies with a registered jack (RJ)-45 wiring standard.

The plug comprises a plug housing that includes a front portion having an optical interface formed therein, a back portion for receiving an end of a cable, a latch mechanism, a wire and optical fiber (WOF) guide device, and an electrical contact configuration. A plurality of electrical contacts are disposed on the front portion of the plug housing. The optical interface includes at least first and second openings formed in the front portion that are configured to couple with ends of a receive optical fiber and a transmit optical fiber, respectively. The plug housing is configured to mate with a plug opening formed in a jack. The latch mechanism is disposed on an upper side of the plug housing. The latch mechanism has at least one locking feature thereon for mating with one or more locking features of a jack. The WOF guide device positions eight position, eight contact (8P8C) copper wires and transmit and receive optical fibers in proper locations prior to insertion into the plug housing into a jack. The WOF guide device also allows field termination of the hybrid cable as commonly practiced for standard electrical cables. The electrical contact configuration of the plug complies with an RJ-45 wiring standard.

The system is capable of performing optical communications or electrical communications over a communications link. The system comprises a system circuit board, at least a first controller integrated circuit (IC) mounted on a surface of the system circuit board, and a modular connector assembly. The system circuit board is located at a proximal end of the communications link. The system circuit board has a plurality of electrical contacts thereon and a plurality of electrically conductive traces routed therethrough. The first controller IC is mounted on a surface of the system circuit board. The first controller IC is configured to auto-negotiate with one or more controller ICs located at one or more distal ends of the communications link to determine whether an optical mode of communications or an electrical mode of communications is to be performed over the communications link. The modular connector assembly is mounted on a surface of the system circuit board and comprises a jack having both electrical and optical communications configurations and a plug configured to be removably connected to the jack. The plug has both optical and electrical communications configurations.

These and other features and advantages of the invention will become apparent from the following description, drawings and claims.

DETAILED DESCRIPTION OF AN EXEMPLARY EMBODIMENT

The invention is directed to a modular connector assembly having both an electrical coupling configuration that complies with the RJ-45 wiring standard and an optical coupling configuration that provides the assembly with optical communications capabilities. In addition, the modular connector assembly is configured to have backwards compatibility with existing 8P8C jacks and plugs that implement the RJ-45 wiring standard. Consequently, the modular connector assembly may be used to communicate optical data signals at higher data rates (e.g., 10 Gb/s and higher) using the jack and plug of the invention or to communicate electrical data signals at lower data rates (e.g., 1 Gb/s) using the known 8P8C jack and plug.

The term "backwards compatibility", as that term is used herein, is intended to mean that the jack and plug of the modular connector assembly can be mated with a jack and plug, respectively, of a typical 8P8C modular connector having typical RJ-45 wiring configurations. Thus, if a typical 8P8C plug having a typical RJ-45 wiring configuration is mated with the jack of the invention, the modular connector assembly will operate as a typical 8P8C modular connector assembly. Similarly, if the plug of the invention is mated with a jack of a typical 8P8C modular connector assembly, the 8P8C modular connector assembly will operate in the typical manner.

Figure 1A:
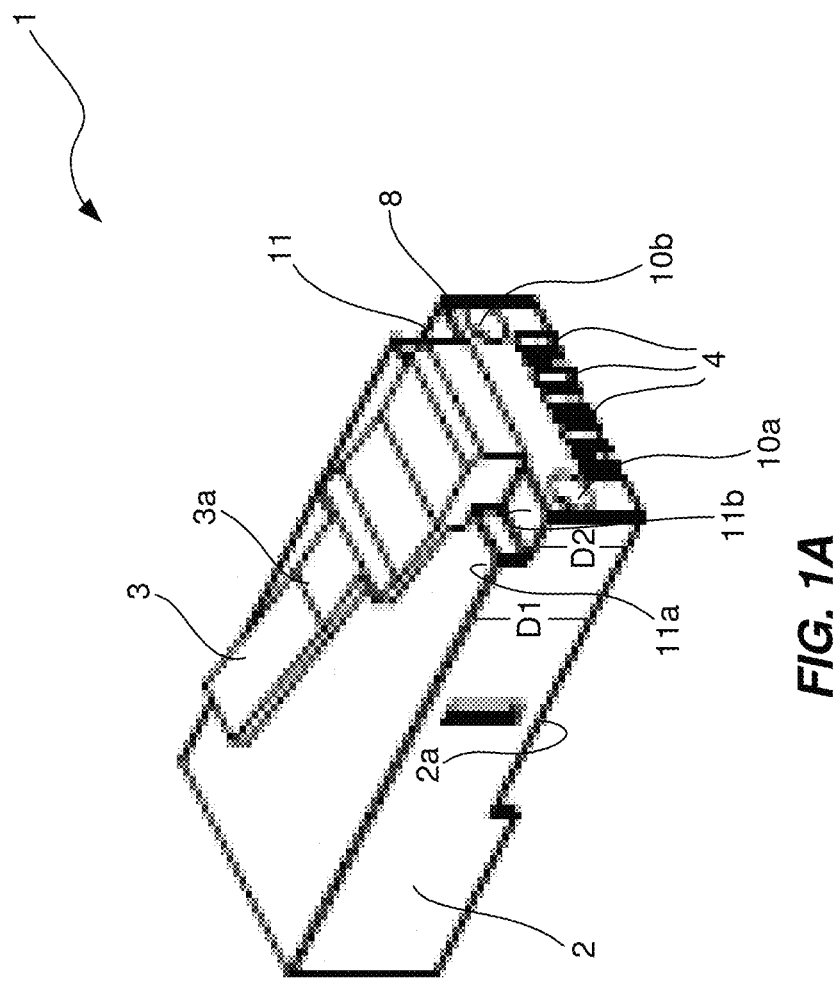
FIGS. 1A-1C illustrates, respectively, perspective top right front, top left front and bottom right front views of the plug 1 of the modular connector assembly in accordance with an illustrative embodiment.
Figure 1B:
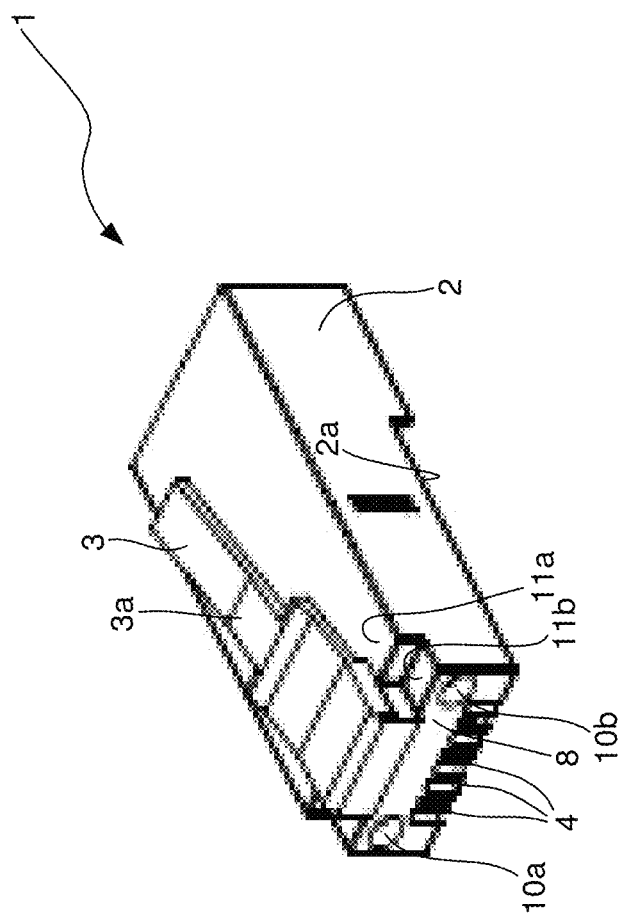
Figure 1C:
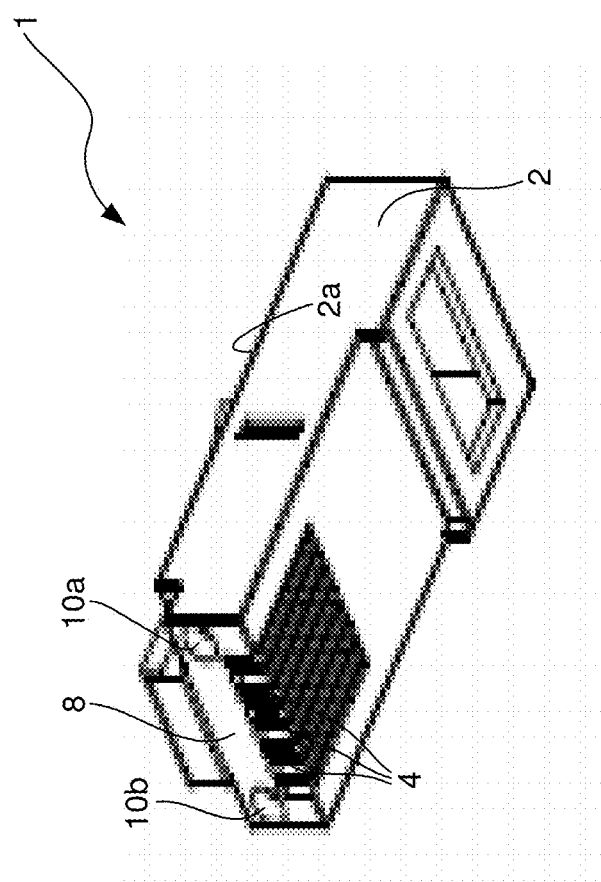

FIGS. 1A-1C illustrate, respectively, perspective top right front, top left front and bottom right front views of the plug 1 of the modular connector assembly in accordance with an illustrative embodiment. The plug 1 is similar in many respects to a typical 8P8C plug used for Ethernet communications in that the plug 1 includes electrical wiring that complies with one of the RJ-45 wiring standards, i.e., either the T-568A or T-568B wiring standard. The plug 1 has a plug housing 2, a latch mechanism 3 formed on a top portion of the plug housing 2, an optical interface comprising openings 10a and 10b formed in a front portion of the plug housing 2, and a plurality of insulation displacement contacts 4 disposed on a bottom portion of the plug 1. The latch mechanism 3 has a locking feature 3a thereon that engages a locking feature of the jack when the plug 1 is mated with a jack, as will be described below in more detail with reference to FIGS. 7-10B. As with a typical 8P8C modular connector assembly plug, the insulation displacement contacts 4 pierce the insulating jackets of twisted copper pair wires of a cable (not shown for purposes of clarity) when the plug 1 is installed on the end of the cable. The cable that is used with the plug 1 will typically be a Category 5 (CAT 5) or a Category 6 (CAT 6) cable as defined by the Electronic Industries Association and Telecommunications Industry Association (EIA/TIA), an optical fiber cable, or a hybrid cable. The CAT 5 and CAT 6 cables are electrical Ethernet cables. There are a variety of optical fiber cables used in the industry today, but the optical fiber cable that may be terminated with the plug 1 will typically be a rounded cable having a transmit optical fiber, a receive optical fiber a strength membrane, and protective jacket. It should be noted, however, that the invention is not limited with respect to the type of cable that is used with the plug 1.

In accordance with an embodiment, a hybrid cable that may be terminated by the plug 1 is a cable that includes electrical wires similar or identical to those contained in, for example, a CAT 5, CAT 5e, CAT 6a, or CAT 7 cable, and that also includes a transmit optical fiber and a receive optical fiber. Such a hybrid cable provides the option of communicating with either electrical Ethernet data signals or optical data signals. The hybrid cable typically comprises eight insulated copper wires, at least one transmit optical fiber, at least one receive optical fiber, and a cable jacket. If the cable is one of the aforementioned known cables, such as a CAT 5, CAT 5e, CAT 6a, or CAT 7 cable, the transmit and receive optical fibers may be embedded within the main cable jacket or they may be external to the main cable jacket and embedded in one or more optical fiber cable jackets. In the latter case, the two cable jackets may be attached to one another by some suitable attachment mechanism. At the end of the cable that attaches to the plug 1, the loose ends of the insulated copper wires can be stripped of their insulation and inserted into a wire and optical fiber (WOF) guide device (not shown for purposes of clarity) of the plug 1 in accordance with the RJ-45 wiring standard, as will be described below in more detail with reference to FIG. 11. The loose ends of the optical fibers can be stripped of their protection jackets and buffers and polished, as is commonly performed for fiber termination. The polished ends would then be inserted into respective ferrules (not shown for purposes of clarity) that are then guided through the aforementioned WOF guide device such that the ferrules are disposed within the respective openings 10*a* and 10*b* that provide the optical interface of the plug 1, as will be described below with reference to FIG. 11.

The openings 10*a* and 10*b* are disposed adjacent the right and left sides of the plug 1 in a proximal end face 8 of the plug 1. As will be described below in more detail below with reference to FIGS. 8-10B, ferrule-type elements (not shown for purposes of clarity) of optical-to-electrical (OE) and electrical-to-optical (EO) conversion modules (not shown for purposes of clarity) are partially received in the openings 10*a* and 10*b*, respectively. Inside of the respective openings 10*a* and 10*b*, the ends of the ferrule-type devices abut respective optics systems (not shown for purposes of clarity) of the plug 1, which, in turn, are optically coupled with the respective ends of a receive optical fiber and a transmit optical fiber, as will be described below in more detail with reference to FIGS. 10B and 11. This optical arrangement provides an optical coupling interface for optically coupling light between the OE and EO conversion modules and the receive and transmit optical fibers, respectively.

The plug housing 2 has a tiered surface 11 formed in the front portion of the plug housing 2 adjacent the proximal end face 8. The tiered surface comprises an upper tier surface 11*a* and a lower tier surface 11*b* such that a first distance, D1, between a lower surface 2*a* of the plug housing 2 and the upper tier surface 11*a* is greater than a second distance, D2, between the lower surface 2*a* of the plug housing 2 and the lower tier surface 11*b*. This difference between the first and second distances D1 and D2 operates in conjunction with the locking feature 3*a* formed on the latch mechanism 3 and in conjunction with complimentary features formed in the jack (not shown for purposes of clarity) to allow the plug 1 to be interlocked with the jack in either a first or a second interlocking position, as will be described below in detail with reference to FIG. 8-10B. Although the tiered surface 11 is not required, it provides one of many possible solutions for providing the plug 1 with both electrical and optical capabilities while also enhancing the versatility of the plug 1. In addition, providing these two different interlocking positions is one way in which the system in which the modular connector assembly is used to automatically differentiate between when it is operating in the electrical Ethernet mode and when it is operating in the optical mode. In addition, because the jack has features that are complimentary to the tiered surface 11, existing 8P8C plugs that are configured to comply with the RJ-45 wiring standard may be interlocked inside of the jack in the normal manner. These features are described in more detail below with reference to FIGS. 6-8.

Figure 2:
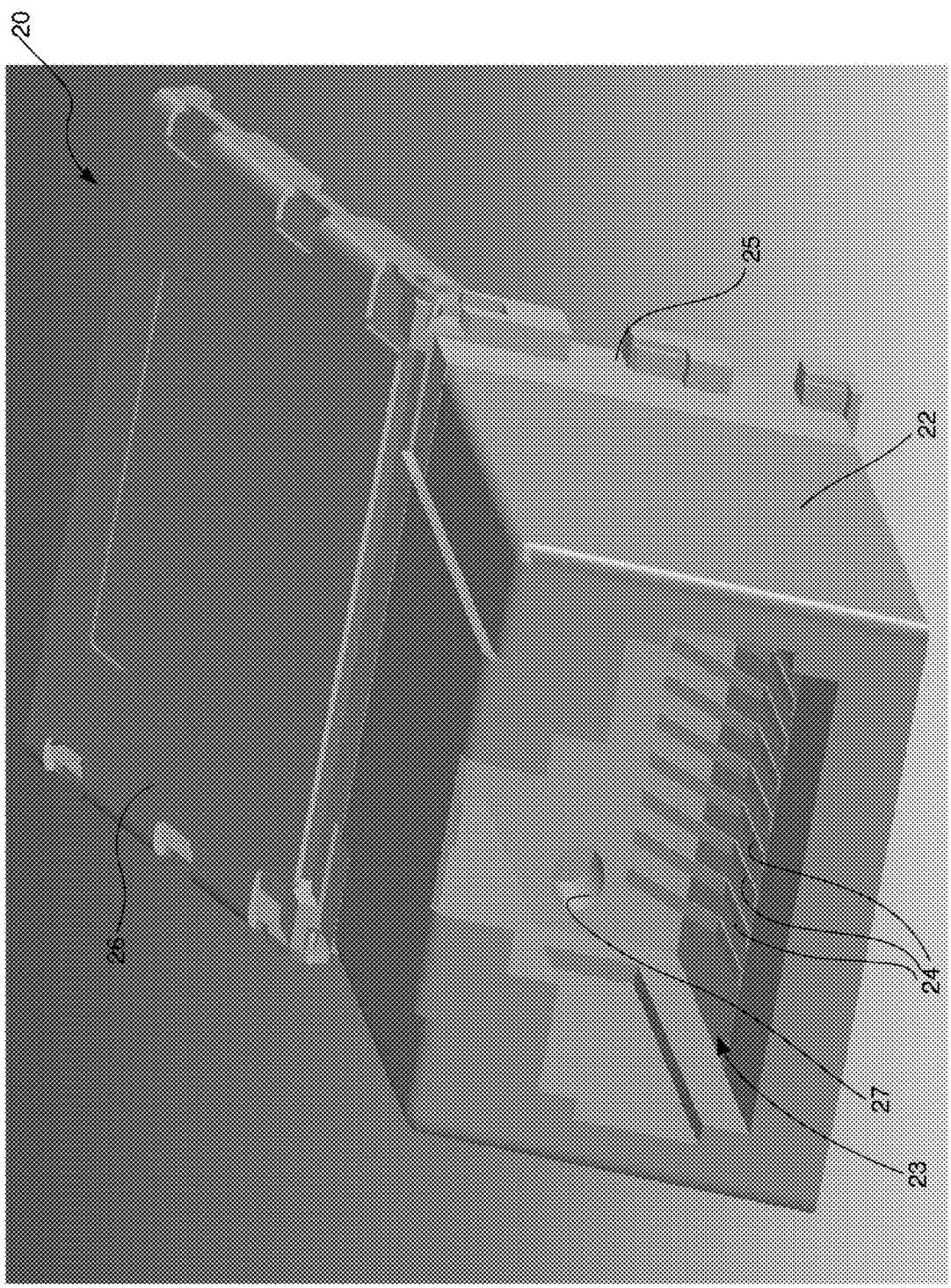
FIG. 2 illustrates a front perspective view of the jack of the modular connector assembly that mates with the plug shown in FIGS. 1A-1C in accordance with an illustrative embodiment.

FIG. 2 illustrates a front perspective view of the jack 20 of the modular connector assembly that mates with the plug 1 shown in FIGS. 1A-1C in accordance with an illustrative embodiment. The jack 20 has a jack housing 22 that has a front opening 23 formed therein. The front opening 23 is configured to receive an 8P8C plug such as the plug 1 shown in FIGS. 1A-1C or a convention 8P8C plug (not shown for purposes of clarity). A plurality (e.g., eight) of electrical contacts 24 are disposed inside of the opening 23 for making contact with respective insulation displacement contacts 4 shown in FIGS. 1A-1C when the plug is locked inside of the jack 20. The electrical contacts 24 are electrically coupled to other electrical circuitry (not shown for purposes of clarity) external to the jack 20. The jack housing 22 has a back cover 25 secured to a back portion of the jack housing 22. The back cover 25 has a door 26 that is in a hinging relationship with the cover 25. The cover 25 has openings 27 formed therein through which the aforementioned ferrule-type elements (not shown for purposes of clarity) of the OE and EO conversion modules (not shown for purposes of clarity) extend when the OE and EO conversion modules are installed in the jack housing 22, as will be described below in more detail with reference to FIGS. 3-5. Alternatively, in an embodiment in which the OE and EO conversion module or modules are installed on an external circuit board (not shown for purposes of clarity) on which the jack housing 22 resides, respective ends of respective optical fibers extend into the respective openings 27 to optically couple the external EO and OE conversion module(s) to the jack 20, as will be described below in more detail with reference to FIG. 13.

Figure 3:
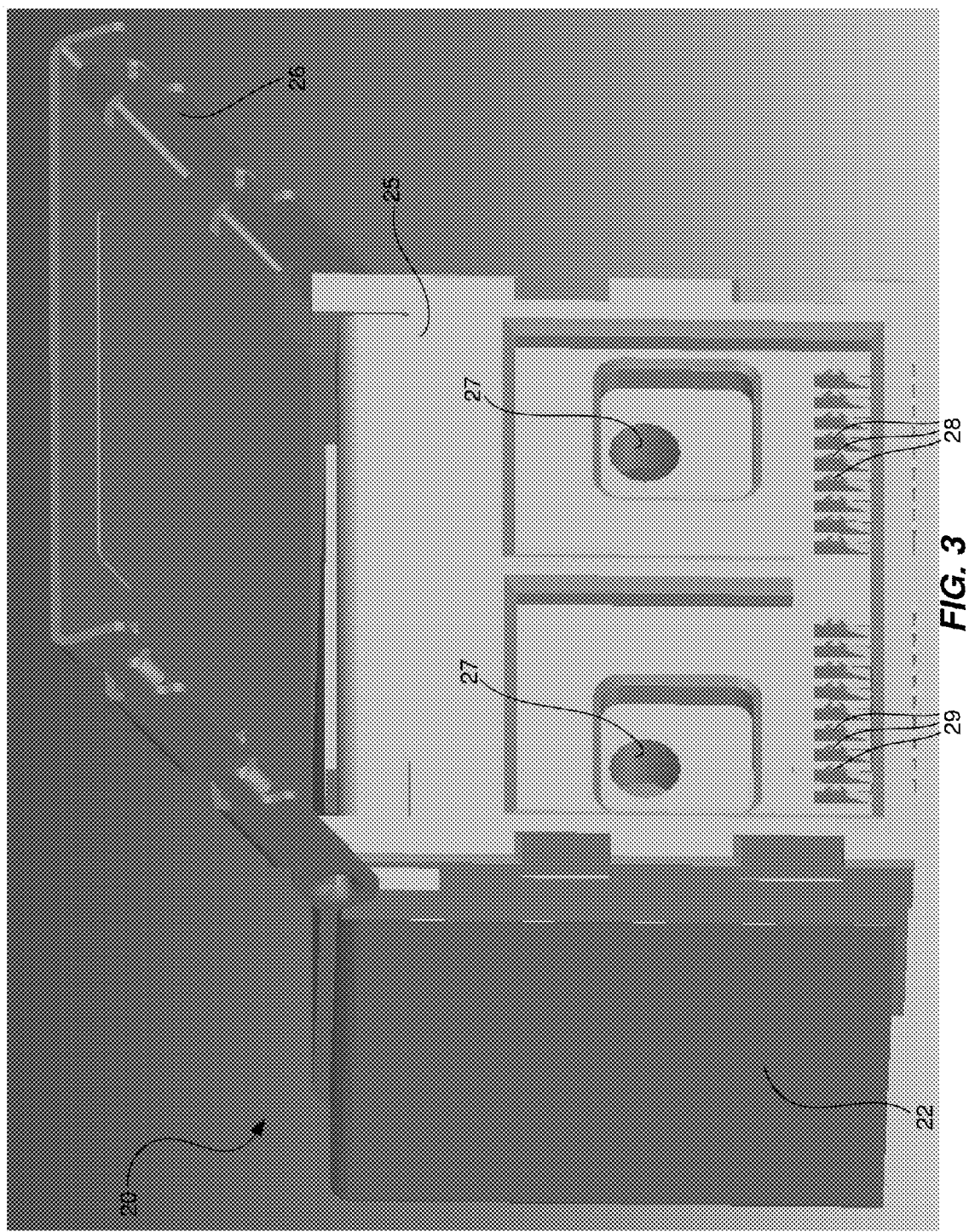
FIG. 3 illustrates a back perspective view of the jack shown in FIG. 2 having the cover attached thereto with the door in the opened position to reveal locations in the cover at which the OE and EO conversion modules will be installed.
Figure 4A:
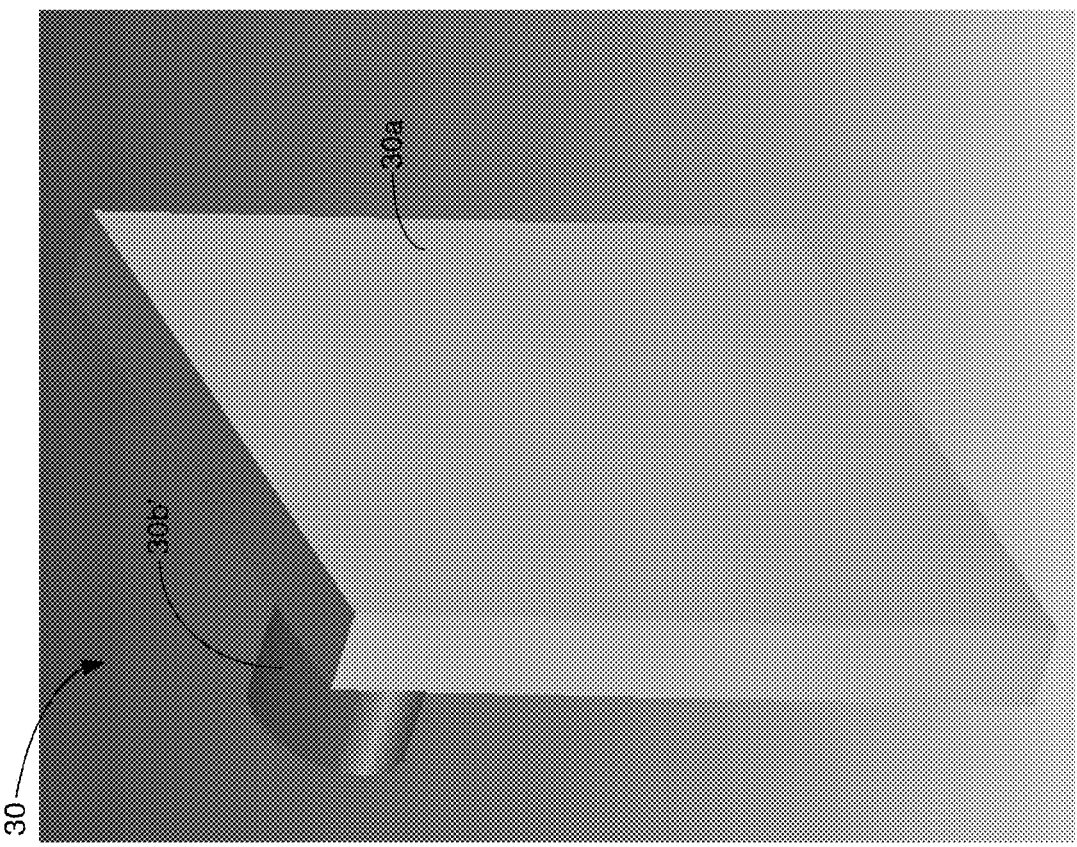
FIGS. 4A and 4B illustrate front and back perspective views, respectively, of the EO and OE conversion modules that attach to the cover shown in FIG. 3.
Figure 4B:
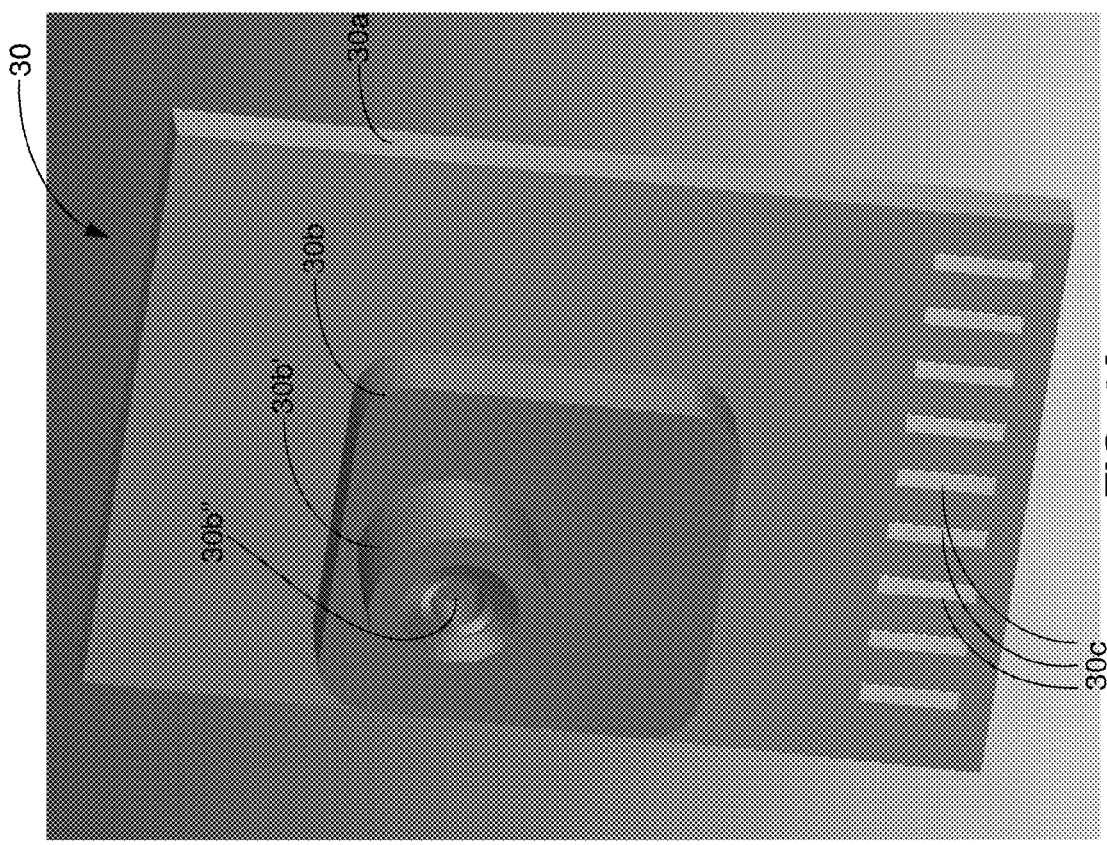

FIG. 3 illustrates a back perspective view of the jack 20 shown in FIG. 2 having the cover 25 attached thereto with the door 26 in the opened position to reveal locations in the cover 25 at which the OE and EO conversion modules (not shown for purposes of clarity) will be installed. FIGS. 4A and 4B illustrate front and back perspective views, respectively, of the EO or the OE conversion module 30. In accordance with this illustrative embodiment, the OE and EO conversion modules 30 are formed on separate substrates. It should be noted, however, that the OE and the EO conversion modules 30 could be integrated on the same substrate. For ease of illustration and in the interest of brevity, the latter approach is not shown in the drawings because its appearance is very similar to that of the EO or OE conversion module 30 shown in FIGS. 4A and 4B.

The EO conversion module 30 includes a substrate 30*a* and an EO module housing 30*b*. The EO module housing 30*b* includes the aforementioned ferrule-type element, which is identified in FIGS. 4A and 4B by reference numeral 30*b'*. The ferrule-type element 30*b'* has an optics system (e.g., a lens)

30b" disposed therein. Inside of the EO module housing 30b, an EO conversion device, which is typically a laser diode (not shown for purposes of clarity), and a corresponding laser diode driver integrated circuit (IC) (not shown for purposes of clarity) are mounted on and electrically coupled to the substrate 30a. Electrical contacts 30c disposed on the PCB 30a come into contact with respective electrical contacts 28 (FIG. 3) disposed on the back cover 25 when the EO conversion module 30 is installed in the back cover 25 of the jack 20. The electrical contacts 28 are electrically coupled by other electrical conductors (not shown for purposes of clarity) to electrical circuitry that is external to the jack 20, as will be described below in more detail with reference to FIG. 12. Alternatively, the EO and OE conversion modules, or a combined EO/OE conversion module could be mounted on an external system board on which the jack housing 22 resides, in which case a ferule-type element similar or identical to the ferrule-type elements 30b' has a fiber end attached to it such that a fiber pigtail disposed on the opposite end of the fiber extends from the EO/OE conversion module into hole 27, as will be described below in more detail with reference to FIG. 13. In such an alternative implementation, the electrical contacts 28 and 29 disposed on the jack housing are unnecessary.

The OE conversion module (not shown for purposes of clarity) is identical in construction to the EO conversion module 30 shown in FIGS. 4A and 4B with the exception that instead of a laser diode and drive IC, the OE conversion module has an OE conversion device, which is typically a P-I-N photodiode (not shown for purposes of clarity), and a receiver IC (not shown for purposes of clarity). The visible components of the OE conversion module will be described with reference to FIGS. 4A and 4B. Although they are not visible in FIGS. 4A and 4B, the P-I-N photodiode and the receiver IC are mounted on and electrically coupled to the substrate 30a.

When an optical cable or hybrid cable is terminated by the plug 1 shown in FIG. 1, light generated by the laser diode is coupled via the optics system 30b" into an end of a transmit optical fiber (not shown for purposes of clarity) of the cable. Conversely, light passing out of the end of a receive optical fiber of the cable is coupled via the optics system 30b" onto the P-I-N photodiode, which converts the light into electrical signals. The electrical signals are then electrically coupled via the electrical contacts 29 (FIG. 3) disposed on the back cover 25 to electrical circuitry that is external to the jack 20, as will be described below in more detail with reference to FIG. 12. As indicated above, instead of the OE and the EO conversion modules residing on two separate substrates as shown in FIGS. 4A and 4B, the laser diode, the P-I-N photodiode, the laser diode driver IC, and the receiver IC may be integrated on a single substrate. Alternatively, the laser driver and the receiver may be integrated into the same IC, which would then be integrated onto a single substrate on which the ferule-type elements 30b' and optics systems 30b" are also integrated on the substrate. In the latter case, the optics systems 30b" may be housed in the same module housing 30b or in separate module housings and the ferule-type elements 30b' may be part of the same module housing or parts of separate module housings.

Figure 5:
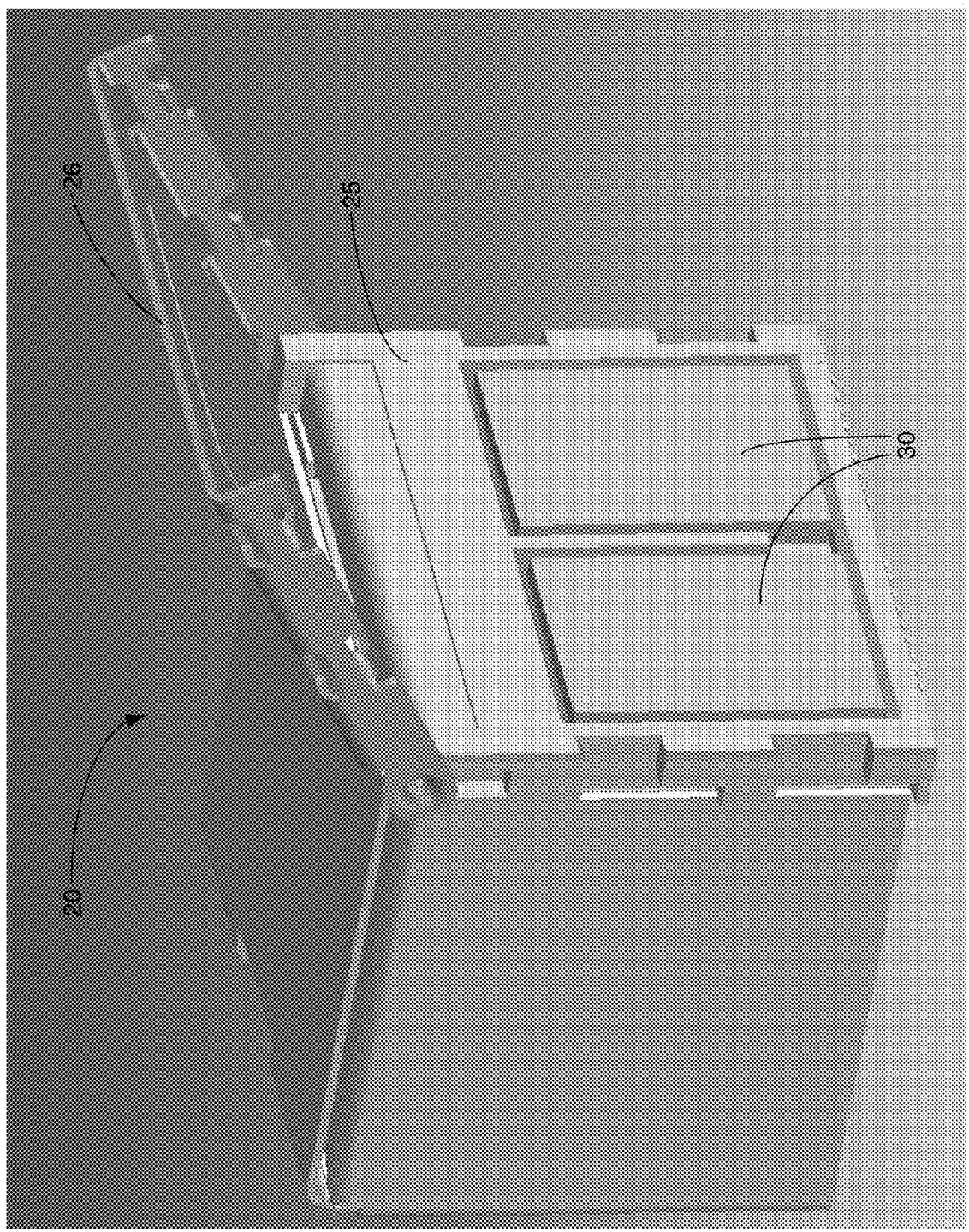
FIG. 5 illustrates a back perspective view of the jack shown in FIG. 2 after the OE and EO conversion modules shown in FIGS. 4A and 4B have been installed in the back of the jack, but prior to the door being closed.
Figure 6:
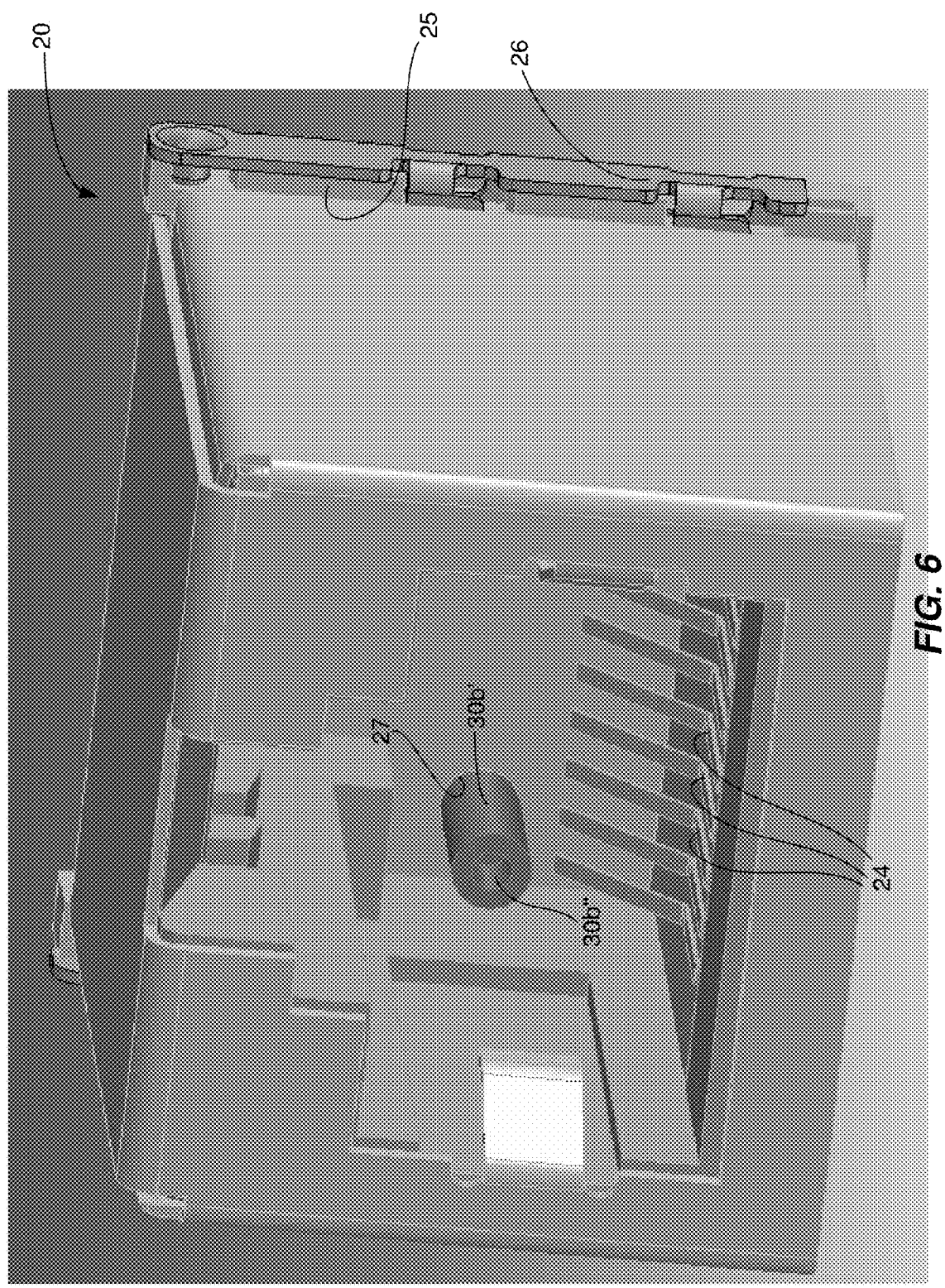
FIG. 6 illustrates a front perspective view of the jack after the OE and EO conversion modules have been installed in the back of the jack and the door has been closed.

FIG. 5 illustrates a back perspective view of the jack 20 shown in FIGS. 2 and 3 after the OE and EO conversion modules 30 have been installed in the back of the jack 20, but prior to the door 26 being closed. FIG. 6 illustrates a front perspective view of the jack 20 shown in FIG. 5 after the OE and EO conversion modules 30 have been installed in the back of the jack 20 and the door 26 has been closed. The end of one of the ferrule-type elements 30b' can be seen positioned within one of the openings 27 formed in the back cover 25. The locations in the cover 25 at which the EO and OE conversion modules 30 are secured to the cover 25 are shown in FIG. 3 as cutaway regions where respective rectangular portions of the cover 25 have been removed to accommodate the shapes of the module housing 30b and the substrate 30a. The invention is not limited with respect to the manner in which the EO and OE conversion modules 30 or the cover 25 are shaped or with respect to the manner in which the modules 30 attach to the cover 25. For example, the entire module housing 30b may extend through the cover 25 into the front opening 23, as will be described below with reference to FIGS. 9-10B, or, alternatively, only the ferule-type elements 30b' may extend through the cover 25 into the front opening 23, as shown FIG. 6.

Figure 7:
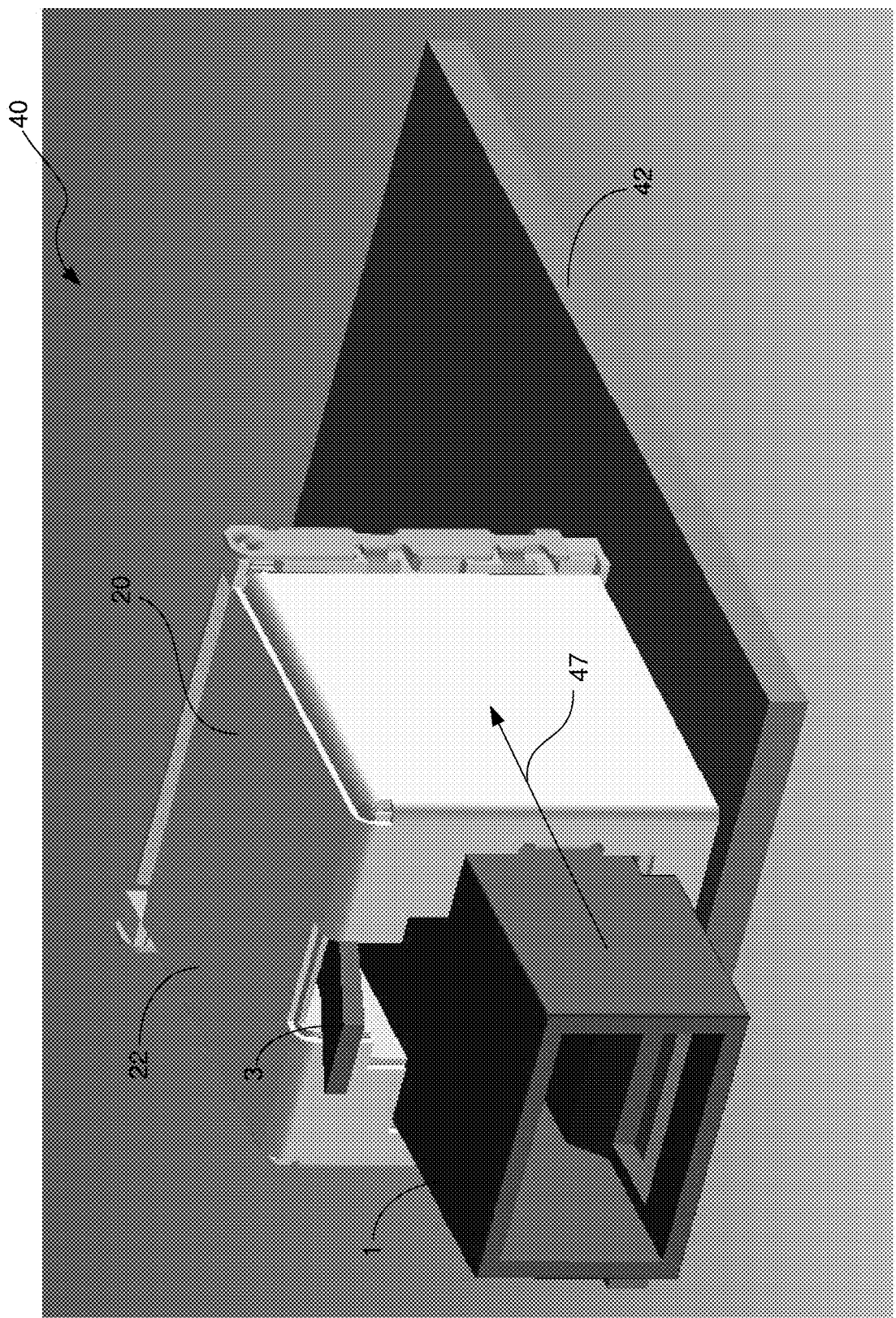
FIG. 7 illustrates a perspective view of the modular connector assembly of the invention comprising the plug shown in FIGS. 1A-1C and the jack shown in FIGS. 2, 3, 5, and 6.
Figure 8:
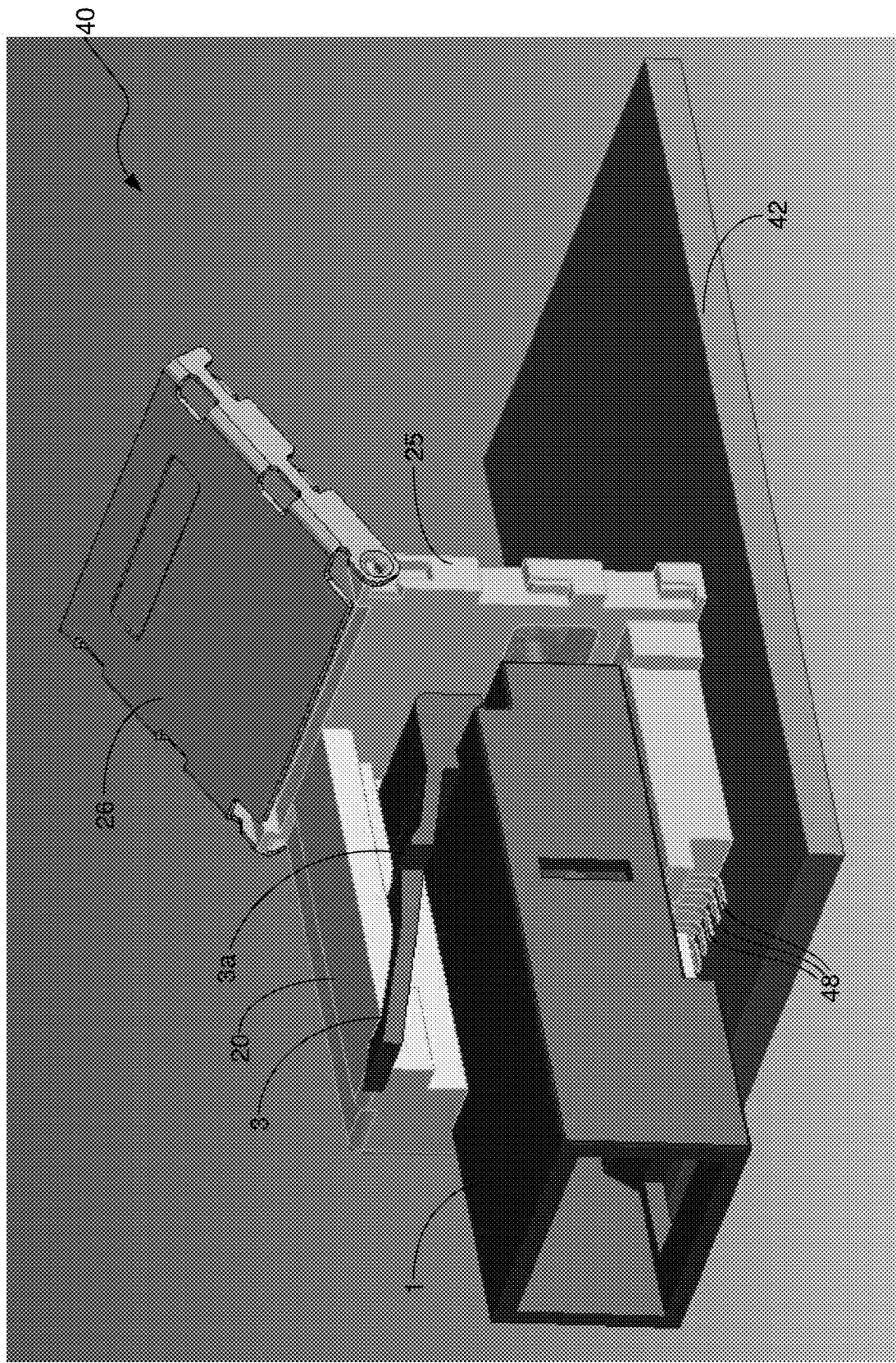
FIG. 8 illustrates a cutaway view of the assembly shown in FIG. 7 with a portion of the jack removed to show the manner in which the plug shown in FIGS. 1A-1C is removably secured to the jack.
Figure 9:
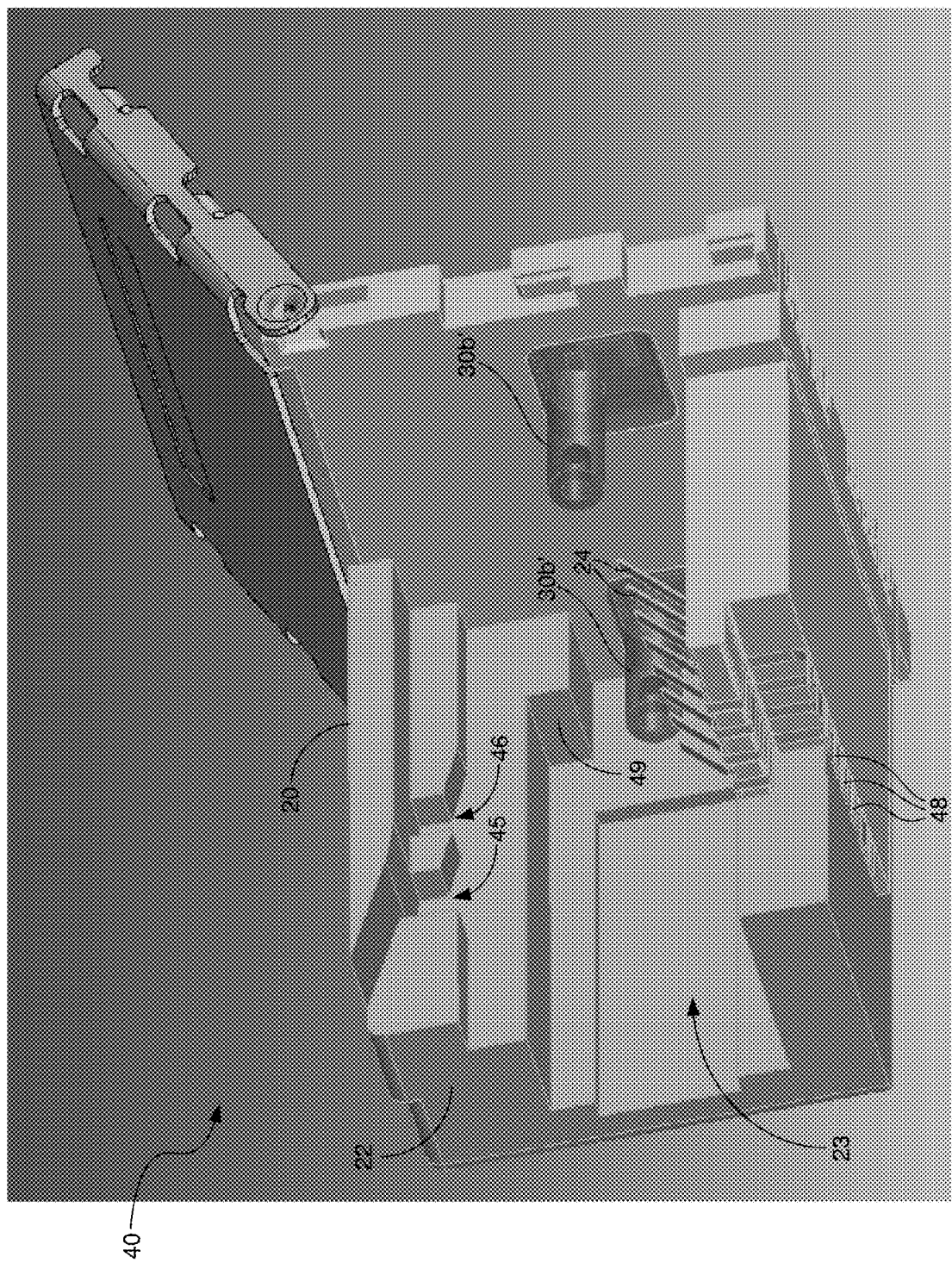
FIG. 9 illustrates a cutaway view of the jack shown in FIG. 2 with the plug shown in FIGS. 1A-1C removed to allow the locking features of the jack to be seen.
Figure 10A:
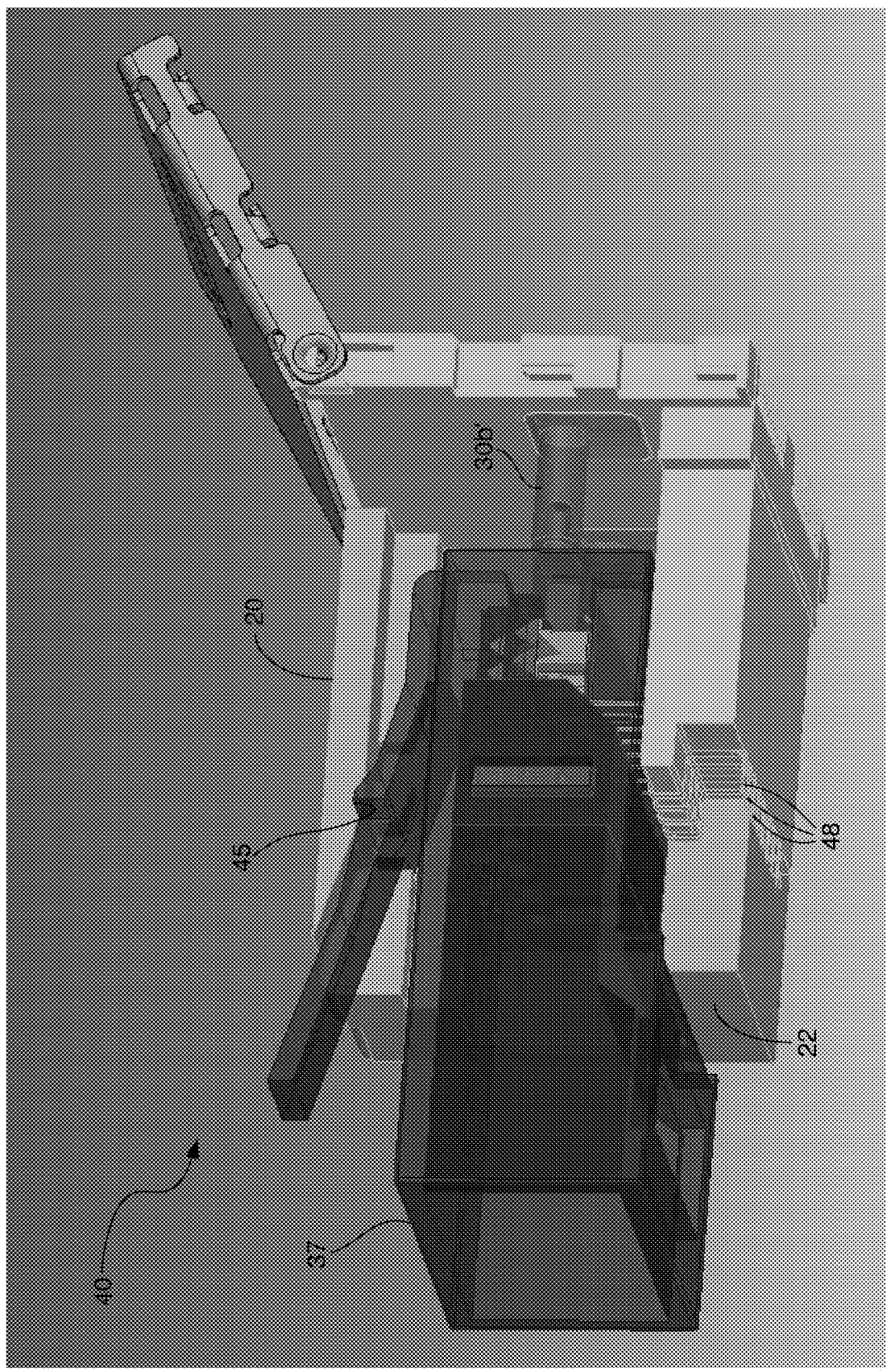
FIG. 10A illustrates a cutaway view of the modular connector assembly shown in FIG. 7 with the plug shown in FIGS. 1A-1C interlocked with the jack in the aforementioned first interlocking position for electrical Ethernet communications.
Figure 10B:
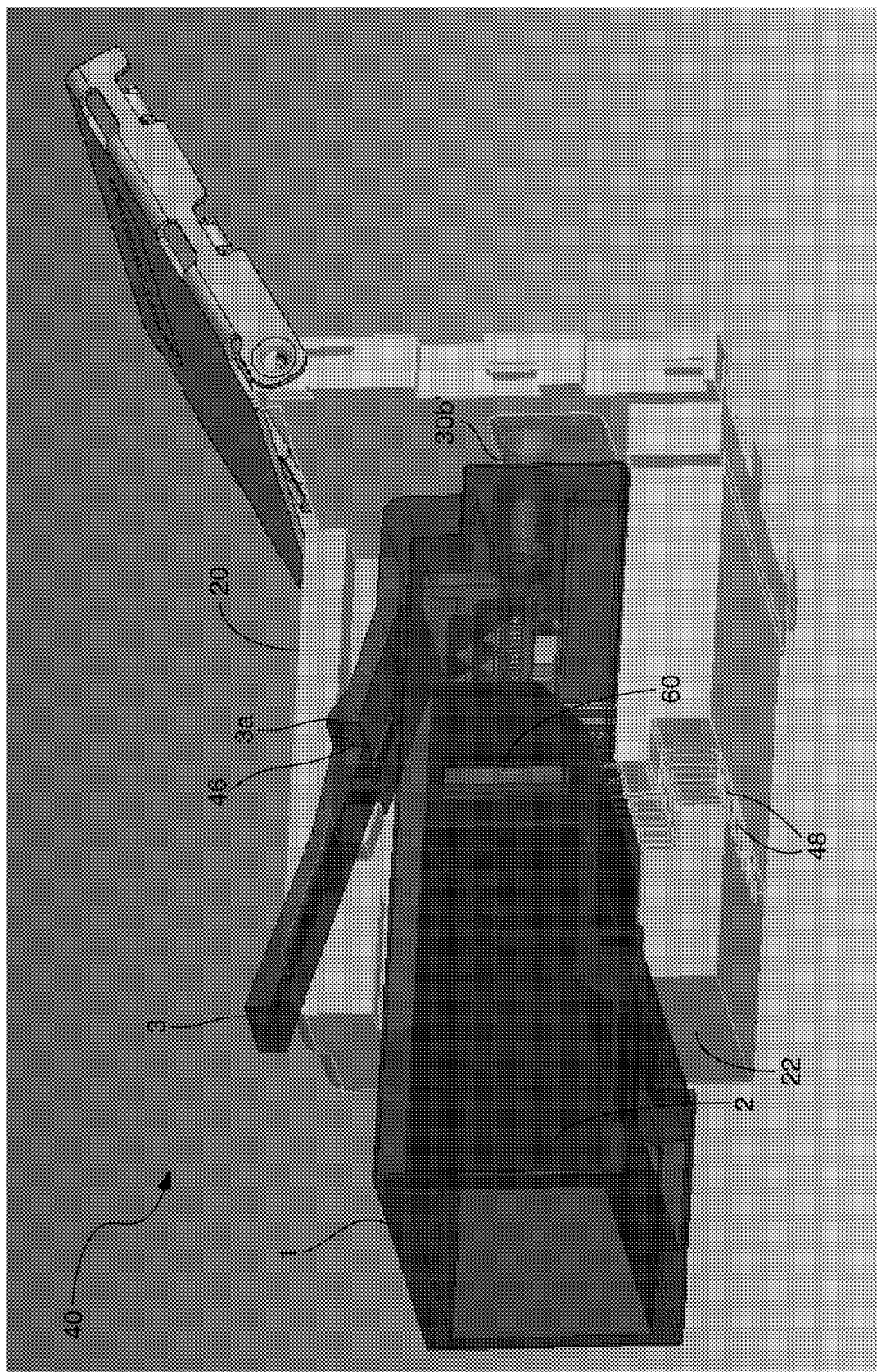
FIG. 10B illustrates a cutaway view of the modular connector assembly shown in FIG. 7 with the plug shown in FIGS. 1A-1C interlocked with the jack shown in FIG. 2 in the aforementioned second interlocking position for optical communications.

FIG. 7 illustrates a perspective view of the modular connector assembly 40 of the invention comprising the plug 1 shown in FIGS. 1A-1C and the jack 20 shown in FIGS. 2, 3, 5, and 6 mounted on a system printed circuit board (PCB) 42. In FIG. 7, the plug 1 and the jack 20 are shown interlocked. FIG. 8 illustrates a cutaway view of the assembly 40 shown in FIG. 7 with a portion of the jack 20 removed to show the manner in which the plug 1 is removably secured to the jack 20. FIG. 9 illustrates a cutaway view of the jack 20 with the plug 1 removed to reveal locking features 45 and 46 of the jack 20. One of the locking features 45 and 46 of the jack 20 engages the locking feature 3a of the latch mechanism 3 when the plug 1 is inserted into the opening 23 formed in the front of the jack 20. FIG. 10A illustrates a cutaway view of a modular connector assembly comprising the jack 20 shown in FIG. 2 and a standard electrical-only RJ-45 plug 37 interlocked with the jack 20 in the aforementioned first interlocking position for electrical Ethernet communications. FIG. 10B illustrates a cutaway view of the modular connector assembly 40 shown in FIG. 7 with the plug 1 shown in FIGS. 1A-1C interlocked with the jack 20 in the aforementioned second interlocking position for either optical communications or Ethernet electrical communications as dictated by the Ethernet Controller and Physical Layer IC shown in FIGS. 12 and 13, as will be described below in detail. The manner in which the plug 1 and the jack 20 are interlocked with each other will now be described with reference to FIGS. 7-10B.

As can be seen in FIG. 9, there are first and second locking features 45 and 46 inside of the opening 23 formed in the front portion of the jack 20. The first and second locking features 45 and 46 are first and second openings, respectively, formed in an upper portion of the jack 20. The first and second locking features 45 and 46 have shapes that are complementary to the shape of the locking feature 3a of the latch mechanism 3. When the plug 1 shown in FIGS. 1A-1C is inserted into the opening 23 formed in the front of the jack 20, one of the locking features 45 and 46 of the jack 20 engages the locking feature 3a of the latch mechanism 3, depending on how far the plug 1 is inserted into the jack 20 in the direction represented by arrow 47 in FIG. 7. Depressing the latch mechanism 3 in the downward direction toward the system PCB 42 unlocks the latch mechanism 3 to allow it to be removed from the jack 20. If the plug 1 is inserted into the jack 20 far enough for the locking feature 3a on the latch mechanism 3 of the plug 1 to be received in locking feature 45, the plug 1 will be interlocked with the jack 20 in the aforementioned first interlocking position. If the plug 1 is inserted into the jack 20 far enough for the locking feature 3a of the latch mechanism 3 of the plug 1 to be received in locking feature 46, the plug 1 will be interlocked with the jack 20 in the aforementioned second interlocking position. FIGS. 10A and 10B show the standard electrical-only plug 37 and the plug 1 of FIGS. 1A-1C, respectively, in the first and second interlocking positions, respectively, inside of the jack 20.

Electrical contacts 48 on the underside of the jack 20 are in contact with electrical contacts (not shown for purposes of clarity) on the system PCB 42. The electrical contacts 48 are distal ends of the electrical contacts 24 disposed in the opening 23 of the jack 20 shown in FIGS. 2 and 6. In the first interlocking position shown in FIG. 10A, the insulation displacement contacts of the standard electrical-only plug, which are similar or identical to the insulation displacement contacts 4 of the plug 1 shown in FIGS. 1A-1C, are electrically coupled via the electrical contacts 24 (FIG. 6) of the jack 20 to the electrical contacts (not shown for purposes of clarity) located on the system PCB 42 beneath the jack 20. This electrical coupling configuration that exists in the first interlocking position enables electrical Ethernet communications to be performed. In the second interlocking position shown in FIG. 10B, optical interfaces are created between the optics systems 30b" of the ferrule-type elements 30b' (FIGS. 4A and 4B) of the OE and EO conversion modules 30 and the ends of the receive and transmit optical fibers, respectively, (not shown for purposes of clarity). As mentioned above, a WOF guide device 60 (FIG. 10B) secured within the plug housing 2 functions as a mechanical guide for mechanically guiding electrical wires of a hybrid cable (not shown for purposes of clarity) and the ferrules on the ends of the optical fibers of the hybrid cable (not shown for purposes of clarity) within the openings 10a and 10b formed in the plug housing 2, as will be described below in more detail with reference to FIG. 11. In the second interlocking position shown in FIG. 10B, the tiered surface 11 of the plug 1 (FIGS. 1A-1C) abuts a complementarily-shaped surface 49 (FIG. 9) formed in an upper portion the jack 20 to stop the forward movement of the plug 1 within the jack opening 23. The optical coupling configuration that exists in the second interlocking position enables optical communications to be performed in addition to, or in lieu of, the electrical communication provided through contacts 48 to the system board 42. As will be described below in more detail with reference to FIG. 12, other components that communicate with the OE and EO conversion modules 30 and/or with the RJ-45 wiring of the jack 20 are mounted on the system PCB 42 and electrically connected via conductors of the system PCB 42 to the electrical contacts 48 of the jack 20.

Figure 11:
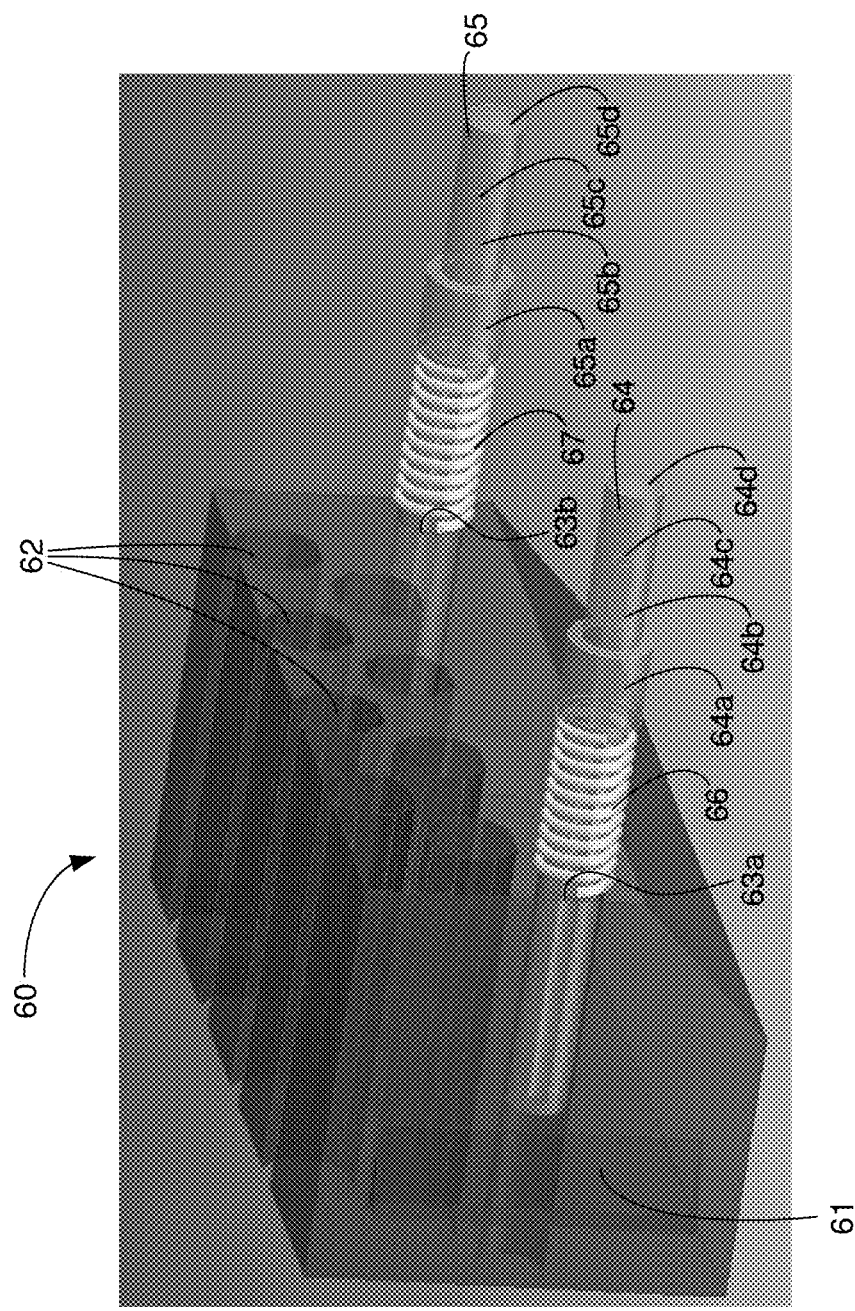
FIG. 11 illustrates a cross-sectional view of the wire guide device of the plug shown in FIGS. 10A and 10B.

FIG. 11 illustrates a cross-sectional view of the WOF guide device 60 shown in FIG. 10B. When the WOF guide device 60 is installed inside of the plug housing 2, locking features 61 on the sides of the guide device 60 are received in openings (not shown for purposes of clarity) formed in the plug housing 2 to interlock the WOF guide device 60 with the plug housing 2. The WOF guide device 60 has openings 63a and 63b formed therein in which ferrules 64 and 65 are disposed, respectively. Each of the ferrules 64 and 65 has a compression spring 66 and 67, respectively, disposed thereon that has a diameter that is slightly larger than the diameter of the respective openings 63a and 63b. Each ferrule 64 and 65 has a flange portion 64a and 65a, respectively, having an outer diameter that is larger than an outer diameter of the ferrules 64 and 65, respectively, and that is about the same size as the outer diameter of the compression springs 66 and 67, respectively. The ferrules 64 and 65 have inner diameters 64b and 65b, respectively, that are about the same size as the outer diameters of receive and transmit optical fiber (not shown for purposes of clarity). When the receive and transmit optical fibers are guided inside of the respective ferrules 64 and 65, the ends of the respective fibers abut respective lenses 64c and 65c formed inside of the respective ferrules 64 and 65.

With reference to FIGS. 1A, 4A, 9, 10B, and 11, when the plug 1 is inserted into the opening 23 formed in the jack 20 and interlocked with the jack 20 in the aforementioned second interlocking position, respective ends 64d and 65d of the respective ferrules 64 and 65 are received inside of the respective ends of the ferrule-type elements 30b' of the respective OE and EO conversion modules 30 such that the respective ends 64d and 65d interface with the respective optics systems 30b" of the respective ferrule-type elements 30b'. As the plug 1 is inserted into the opening 23 formed in the jack 20 and the respective ends 64d and 65d of the ferrules 64 and 65 come into contact with the respective optics systems 30b", the force in the direction of insertion of the plug 1 causes the ferrules 64 and 65 to retract into the openings 63a and 63b, respectively, formed in the WOF guide device 60. Once the locking feature 3a of the latch mechanism 3 of the plug 1 interlocks with the locking feature 46 formed on the jack housing 22, retraction of the ferrules 64 and 65 ceases. The compression springs 66 and 67 exert forces that maintain the ends 64d and 65d in abutment with the respective optics systems 30b'. The resulting coupling of optical signals between the ends 64d and 65d of the respective ferrules 64 and 65 and the respective optics systems 30b" occurs with very little, if any, optical loss.

Figure 12:
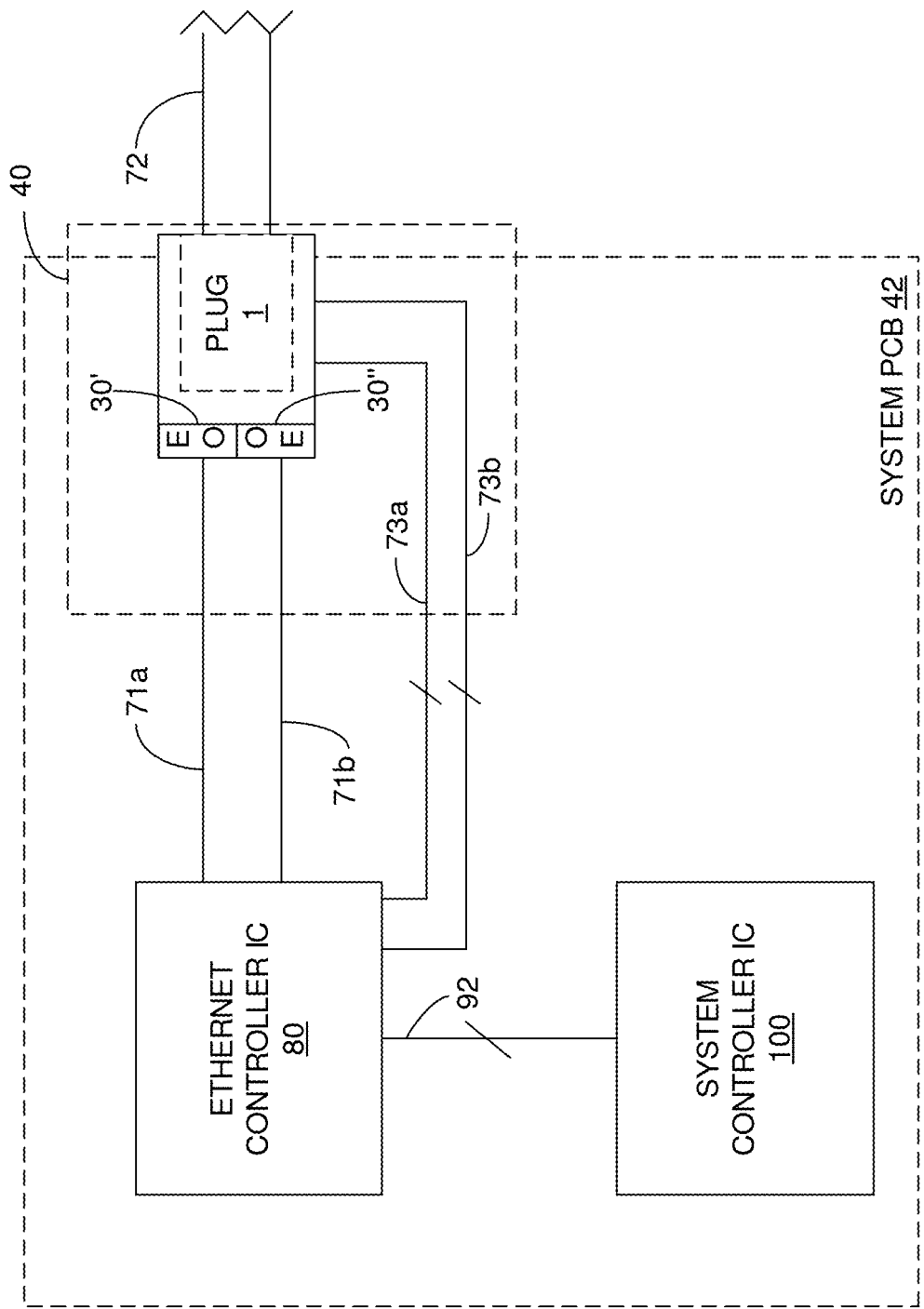
FIG. 12 illustrates a block diagram of the system PCB shown in FIGS. 7 and 8 having the modular connector assembly shown in FIG. 7 and additional components mounted thereon in accordance with one illustrative embodiment.

FIG. 12 illustrates a block diagram of the system PCB 42 shown in FIGS. 7 and 8 having the modular connector assembly 40 and additional components mounted thereon. In the illustrative embodiment described above with reference to FIGS. 1A-11, the OE and EO conversion modules 30, which are labeled with reference numerals 30' and 30" in FIG. 12, are integrated into the jack 20. When the OE and EO conversion modules 30' and 30" are installed in the jack 20 in the manner described above with reference to FIG. 5, the electrical contacts 30c (FIG. 4A) of the modules 30' and 30" are in contact with the respective electrical contacts 28 and 29 of the cover 25 (FIG. 3), which are, in turn, in contact with respective electrical connections (not shown for purposes of clarity) disposed on the system PCB 42 (FIGS. 7 and 8). With reference to FIG. 12, electrical traces 71a and 71b electrically couple the OE and EO conversion modules 30' and 30" to an Ethernet Controller and Physical Layer (ECPL) IC 80. Electrical trace group 73a and 73b carry electrical Ethernet signals to and from the electrical contacts 48 of the jack 20 to and from the ECPL IC 80. As will be described below in more detail, the EPCL IC 80 has the capability of performing auto-negotiation with a corresponding IC (not shown for purposes of clarity) located at the end of the link opposite the end of the link to which the modular connector assembly 40 is installed in order to choose whether to carry out electrical or optical communications.

When optical signals are to be transmitted from the system PCB 42 over the cable 72, which is either an optical cable or a hybrid cable, electrical signals are transmitted from the EPLC IC 80 over the electrically conductive traces 71a to the EO conversion module 30'. The EO conversion module 30' converts the electrical signals into optical signals and couples the optical signals into an end of a transmit optical fiber (not shown for purposes of clarity) of the cable 72. When optical signals received over a receive optical fiber (not shown for purposes of clarity) of the cable 72 are coupled from the end of the receive optical fiber into the OE conversion module 30", the OE conversion module 30" converts the optical signals into electrical signals and couples the electrical signals onto the electrically conductive traces 71b for transmission to the EPLC IC 80. The EPLC IC 80 communicates via electrically conductive traces 92 with the system controller IC 100.

When electrical Ethernet signals are to be transmitted from the system PCB 42 over the cable 72, which is either an Ethernet cable or a hybrid cable, electrical signals are transmitted from the EPLC IC 80 over the electrically conductive traces 73a to RJ-45 electrical circuitry (not shown for purposes of clarity) within the jack 20 and plug 1. The electrical signals are then electrically coupled from the RJ-45 electrical circuitry within the jack 20 and plug 1 onto one or more electrical wires of the cable 72. When electrical Ethernet signals are received over one or more electrical wires of the cable 72, the electrical signals are coupled via the RJ-45 electrical circuitry of the plug 1 and jack 20 from the ends of the electrical wires of the cable 72 onto the electrically conductive traces 73b, which carry the electrical signals to the EPLC IC 80.

Figure 13:
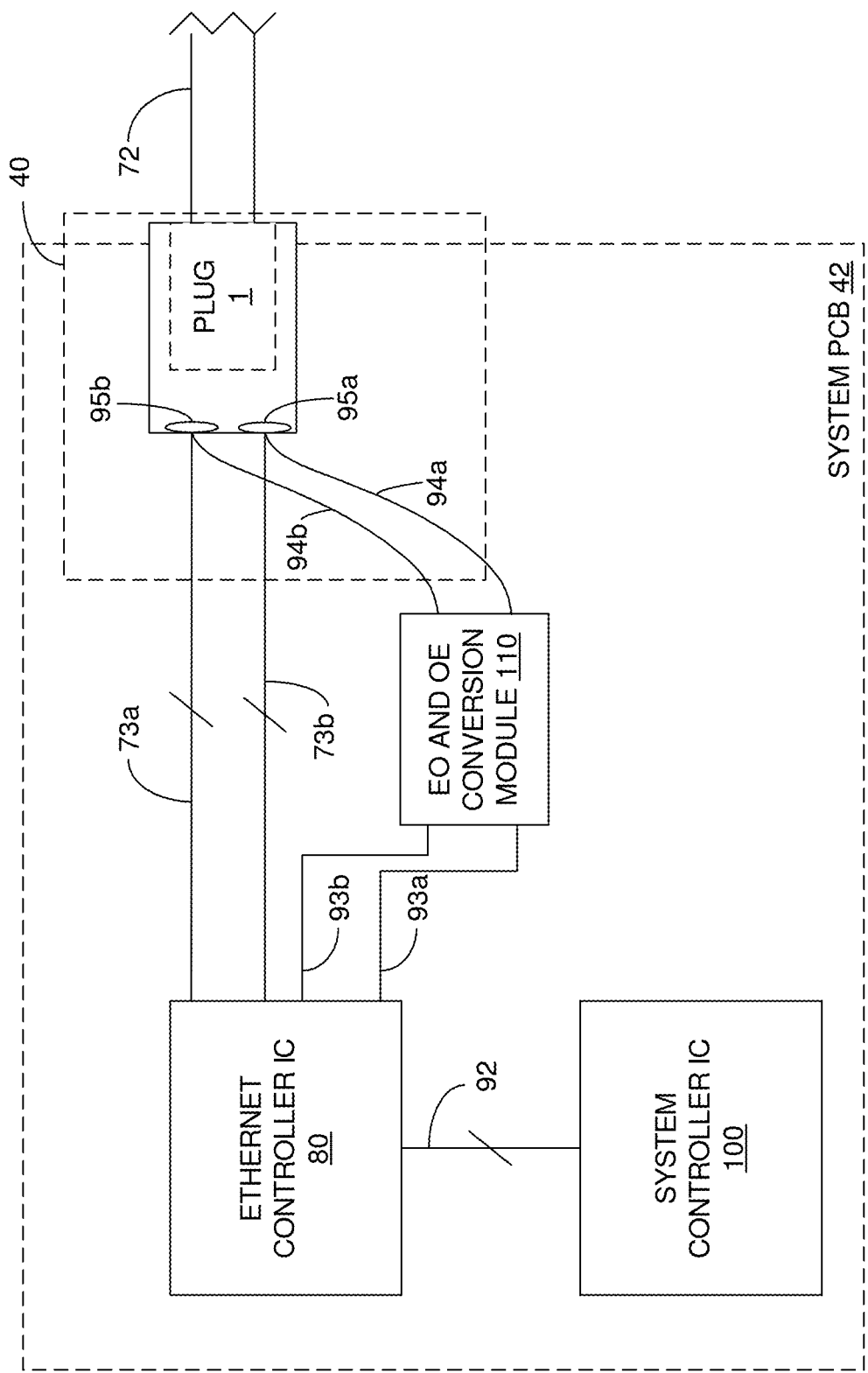
FIG. 13 illustrates a block diagram of the system PCB shown in FIGS. 7 and 8 having the modular connector assembly shown in FIG. 7 and additional components mounted thereon in accordance with another illustrative embodiment.

As an alternative to the illustrative embodiment described above with reference to FIG. 12, the OE/EO conversion modules may be external to the jack 20 and mounted on the system PCB 42, as will now be described with reference to FIG. 13. FIG. 13 illustrates a block diagram of the system PCB 42 having the modular connector assembly 40 shown in FIGS. 7 and 8 and additional components mounted thereon, including an EO and OE (EO/OE) conversion module 110. In accordance with this embodiment, the EO/OE conversion module 110 is external to the jack 20. The jack 20 may be identical to the jack shown in FIGS. 2, 3 and 5 except that the OE and EO conversion modules 30 shown in FIGS. 4A and 4B have been removed from the jack 20. Two optical fibers 94a and 94b optically couple the EO/OE conversion module 110 to the jack 20. The ends of the optical fibers 94a and 94b that are to be inserted into the jack 20 may have ferrules on them that are similar or identical to the ferrules 64 and 65 shown in FIG. 11 or to the ferrule-type elements 30b' shown in FIG. 9. These ends having the ferrules or ferrule-type elements on them are inserted into the back of jack 20 through the holes 27 shown in FIG. 3. The ports of the EO/OE conversion module 110 may have ferrule-type elements that are similar to the ferrule-type elements 30b' shown in FIG. 9.

When optical signals are to be transmitted from the system PCB 42 over the cable 72, electrical signals are transmitted from the EPLC IC 80 over the electrically conductive trace 93a to the EO/OE conversion module 110. The EO/OE conversion module 110 converts the electrical signals into optical signals and couples the optical signals into the end of the optical fiber 94a connected thereto. The optical signals carried on the optical fiber 94a are optically coupled via a lens element 95a into an end of a transmit optical fiber (not shown for purposes of clarity) of the cable 72. When optical signals are received in the jack 20 over a receive optical fiber (not shown for purposes of clarity) of the cable 72, the optical signals are coupled via lens element 95b into the end of the optical fiber 95b connected thereto, which carries the optical signals to the EO/OE conversion module 110. The optical signals are optically coupled out of the opposite end of the optical fiber 95b into the EO/OE conversion module 110, which converts the optical signals into electrical signals. The electrical signals are then communicated via electrically conductive trace 93b to the EPLC controller IC 80.

When electrical Ethernet signals are to be transmitted from the system PCB 42 over the cable 72, electrical signals are sent from the EPLC IC 80 over the electrically conductive traces 73a to the RJ-45 electrical circuitry (not shown for purposes of clarity) within the jack 20 and plug 1. The electrical signals are then electrically coupled from the RJ-45 electrical circuitry within the jack 20 and plug 1 onto one or more electrical wires of the cable 72. When electrical Ethernet signals are received over one or more electrical wires of the cable 72, the electrical Ethernet signals are coupled via the RJ-45 electrical circuitry of the plug 1 and jack 20 from the ends of the electrical wires of the cable 72 onto the electrically conductive traces 73b, which carry the electrical signals to the EPLC IC 80.

The manner in which the aforementioned auto-negotiation process is performed will now be described. As indicated above, the EPLC IC 80 automatically selects whether to use optical or electrical communications. This can be achieved in a manner similar to the auto-negotiation function defined in Clause 28 of, for example, the 802.3a Ethernet standards, in which the data rate capabilities of the Ethernet stations involved in the network are made known and a fixed data rate is selected through the defined exchange of electrical pulse sequences. In accordance with the invention, the auto-negotiation process is carried out on the electrical Ethernet path (1000 megabits per second (Mbps), or 10 Mbps, or 1 Mbps) to determine whether optical paths are shared among the stations in the network and therefore to be activated as the mode of communication; a specific value of the 7-bit field in the auto-negotiation base page can be defined to indicate the optical capability of a station configured similar to that depicted in either of FIG. 12 or 13. With reference to FIGS. 12 and 13, the EPLC IC 80 performs the auto-negotiation process with one or more similar or identical controller ICs located at one or more opposite ends of the link to determine whether electrical or optical communications are to be performed and then selects the appropriate mode of operations. Typically, if the opposite end of the link is configured to perform optical communications, the EPLC IC 80 will select the optical mode of operations due to the fact that they can be performed at a higher data rate; otherwise, the EPLC IC 80 will select the electrical mode of operations.

As indicated above, the plug 1 and jack 20 are backwards compatible with existing 8P8C modular connector assembly jacks and plugs. In other words, the jack and plug of the modular connector assembly can be mated with a jack and plug, respectively, of a typical 8P8C modular connector having typical RJ-45 wiring configurations. Thus, if a typical 8P8C plug having a typical RJ-45 wiring configuration is mated with the jack of the invention, the modular connector assembly will operate as a typical 8P8C modular connector assembly. Similarly, if the plug of the invention is mated with a jack of a typical 8P8C modular connector assembly, the 8P8C modular connector assembly will operate in the typical manner. If, however, an optical cable or hybrid cable plug having the configuration shown in FIGS. 1A-1C is connected to a jack having the configuration shown in FIGS. 2, 3 and 5, the resulting modular connector assembly can be operated either in the optical mode or in the electrical Ethernet mode, as described above with reference to FIGS. 12 and 13. These features allow high-speed electrical or optical operations to be performed and provide the modular connector assembly with great versatility.

It should be noted that the invention has been described with reference to a few illustrative, or exemplary, embodiments for the purposes of demonstrating the principles and concepts of the invention. It will be understood by persons skilled in the art, in view of the description provided herein, that many modifications may be made to the embodiments described herein without deviating from the principles of the invention. For example, instead of having first and second locking features 45 and 46 formed on the jack housing 22 inside of the opening 23 and a single locking feature 3a formed on the latch mechanism 3, a single locking feature 45 or 46 may be formed on the jack housing 22 and multiple, spaced apart locking features 3a may be formed on the latch mechanism 3 of the plug 1. As will be understood by those skilled in the art, all such modifications are within the scope of the invention.

What is claimed is:

1. A plug of a modular connector assembly comprising:
a plug housing comprising:
a front portion having a plurality of electrical contacts disposed thereon and an optical interface, the optical interface including at least first and second openings formed in the front portion, the first opening being configured to couple with an end of a receive optical fiber, the second opening being configured to couple with an end of a transmit optical fiber, the plug housing being configured to mate with a plug opening formed in a jack;
a latch mechanism disposed on an upper side of the plug housing, the latch mechanism having at least one locking feature thereon for mating with one or more locking features of the jack; and
an electrical contact configuration that complies with an Ethernet wiring standard, wherein the plug housing is structured so that if the plug is inserted into the plug opening of the jack to a first distance, the plug housing and the plug opening form an electrical connection for electrical Ethernet communications, and if the plug is inserted into the plug opening of the jack to a second distance, the plug housing and the plug opening form an optical connection for optical communications, wherein the first distance is different from the second distance.

2. The plug of claim 1, wherein the modular connector assembly is an eight position, eight contact (8P8C) modular connector assembly.

3. The plug of claim 1, wherein plug is configured to mate with all of the following jacks:
a standard eight position, eight contact (8P8C) jack having an electrical contact configuration that complies with an RJ-45 wiring standard;
an optical jack having only an optical configuration; and
a hybrid jack having both an electrical contact configuration that complies with an RJ-45 wiring standard and an optical configuration.

4. The plug of claim 1, further comprising:
first and second ferrules disposed at least partially inside of the first and second openings, the first and second ferrules including spring mechanisms that bias the ferrules forward while allowing the ferrules to move in axial directions relative to respective longitudinal axes of the first and second openings, the first and second ferrules having respective inner diameters sized to receive the ends of the receive and transmit optical fibers, respectively.

5. The plug of claim 1, wherein the front portion of the plug has a tiered surface that allows the plug to be mechanically coupled with the jack to form an electrical connection for electrical Ethernet communications if the plug housing is inserted into the plug opening the first distance, allows the plug to be mechanically coupled with the jack to form an optical connection for optical communications if the plug housing is inserted into the plug opening the second distance.

6. A modular connector assembly comprising:
a jack comprising:
a jack housing, a front portion of the jack housing having a plug opening formed therein, the plug opening being configured to receive a plug, a back portion of the jack housing having an optical interface formed therein, the optical interface being configured to optically couple with one or more modules that perform optical-to-electrical (OE) conversion and electrical-to-optical (EO) conversion, wherein at least one locking feature is formed on the jack housing in the plug opening; and
an electrical contact configuration that complies with an Ethernet wiring standard; and
a plug comprising:
a plug housing, a front portion of the plug housing having a plurality of electrical contacts disposed thereon and an optical interface, the optical interface including at least first and second openings formed in the front portion of the plug housing, the first opening being configured to couple with an end of a receive optical fiber, the second opening being configured to couple with an end of a transmit optical fiber, the plug housing being configured to mate with the plug opening formed in the jack, wherein a latch mechanism is disposed on an upper side of the plug housing, the latch mechanism having at least one locking feature thereon for mating with said at least one locking feature of the jack housing;
and
an electrical contact configuration that complies with an Ethernet wiring standard;
wherein the plug housing is structured so that if the plug is inserted into the plug opening of the jack housing to a first distance, the plug housing and the plug opening form an electrical connection for electrical Ethernet communications, and if the plug is inserted into the plug opening of the jack to a second distance, the plug housing and the plug opening form an optical connection for optical communications, wherein the first distance is different from the second distance.

7. The modular connector assembly of claim 6, further comprising an EO and OE (EO/OE) conversion module secured to the back portion of the jack housing.

8. The modular connector assembly of claim 6, further comprising an EO conversion module and an OE conversion module secured to the back portion of the jack housing.

9. The modular connector assembly of claim 8, wherein the EO conversion module comprises:
an EO conversion module substrate;
a plurality of electrical contacts disposed on the EO conversion module substrate;
at least one laser diode attached to the EO conversion module substrate;
at least one laser diode driver integrated circuit (IC) attached to the EO conversion module substrate;
an optics system; and
a ferrule-type element.

10. The modular connector of claim 9, wherein the OE conversion module comprises:
an OE conversion module substrate;
a plurality of electrical contacts disposed on the OE conversion module substrate;
at least one photodiode attached to the OE conversion module substrate;
at least one receiver IC attached to the OE conversion module substrate;
an optics system; and
a ferrule-type element.

11. The modular connector assembly of claim 6, further comprising a first lens element and a second lens element secured to the back portion of the jack housing, the back portion of the jack housing being configured to connect to ends of first and second optical fibers at first and second locations adjacent the first and second lens elements, respectively, wherein second ends of the first and second optical fibers are coupled to EO and OE conversion modules, respectively, that are external to the jack.

12. The modular connector assembly of claim 6, wherein the jack has at least first and second locking features for interlocking the plug with the jack, wherein if the plug is received by the plug opening to the first distance, the first locking feature interlocks the plug with the jack for electrical Ethernet communications, and if the plug is received by the plug opening to the second distance, the second locking feature interlocks the plug with the jack for optical communications.

13. The modular connector assembly of claim 6, wherein the modular connector assembly is an eight position, eight contact (8P8C) modular connector assembly.

14. The modular connector assembly of claim 6, further comprising:
   first and second ferrules disposed at least partially inside of the first and second openings, the first and second ferrules including spring mechanisms that bias the ferrules forward while allowing the ferrules to move in axial directions relative to respective longitudinal axes of the first and second openings, the first and second ferrules having respective inner diameters sized to receive the ends of the receive and transmit optical fibers, respectively.

15. The modular connector assembly of claim 6, wherein the front portion of the plug has a tiered surface that allows the plug to be mechanically coupled with the jack to form an electrical connection for electrical Ethernet communications if the plug housing is inserted into the plug opening the first distance, allows the plug to be mechanically coupled with the jack to form an optical connection for optical communications if the plug housing is inserted into the plug opening the second distance.

16. The modular connector assembly of claim 6, further comprising:
   a hybrid cable having a first end and a second end, the first end of the hybrid cable being secured to a back portion of the plug housing, the hybrid cable having a plurality of electrical conductors and at least said transmit and receive optical fibers, wherein first ends of the electrical conductors are in contact with respective electrical contacts disposed on the front portion of the plug housing.

17. The plug of claim 6, wherein said plurality of electrical conductors include at least eight electrical conductors.

18. The modular connector assembly of claim 6, wherein the jack is mounted on a surface of a circuit board, the circuit board having a plurality of electrical contacts thereon.

19. The modular connector assembly of claim 18, further comprising a first controller integrated circuit (IC) mounted on a surface of the circuit board.

20. The modular connector assembly of claim 19, wherein the first controller IC is configured to auto-negotiate with at least one second controller IC located at one or more distal ends of a communications link established between the circuit board and the at least one second controller IC.

* * * * *